US012811175B2

(12) United States Patent
Oh et al.

(10) Patent No.: US 12,811,175 B2
(45) Date of Patent: Nov. 24, 2026

(54) METHOD FOR MANUFACTURING ELECTRODE ASSEMBLY, SEALING UNIT USED FOR THE SAME, AND ELECTRODE ASSEMBLY MANUFACTURED BY SEALING UNIT

(71) Applicant: LG Energy Solution, Ltd., Seoul (KR)

(72) Inventors: Se Young Oh, Daejeon (KR); Jung Su Oh, Daejeon (KR); Jeong Min Ha, Daejeon (KR); Geun Hee Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 704 days.

(21) Appl. No.: 18/033,498

(22) PCT Filed: Oct. 19, 2021

(86) PCT No.: PCT/KR2021/014564
§ 371 (c)(1),
(2) Date: Apr. 24, 2023

(87) PCT Pub. No.: WO2022/139142
PCT Pub. Date: Jun. 30, 2022

(65) Prior Publication Data

US 2023/0387449 A1 Nov. 30, 2023

(30) Foreign Application Priority Data

Dec. 23, 2020 (KR) ........................ 10-2020-0182649
Jun. 8, 2021 (KR) ........................ 10-2021-0074476

(51) Int. Cl.
*H01M 10/04* (2006.01)
*H01M 50/105* (2021.01)
(Continued)

(52) U.S. Cl.
CPC ..... *H01M 10/0431* (2013.01); *H01M 50/105* (2021.01); *H01M 50/186* (2021.01); *H01M 50/466* (2021.01)

(58) Field of Classification Search
CPC ........... H01M 10/0431; H01M 50/105; H01M 50/186; H01M 50/466; H01M 10/0404;
(Continued)

(56) References Cited

U.S. PATENT DOCUMENTS

2005/0214647 A1 9/2005 Tanaka et al.
2011/0059340 A1* 3/2011 Dougherty ............. H01G 11/60 429/57

(Continued)

FOREIGN PATENT DOCUMENTS

CN 108140759 A 6/2018
CN 111279535 A 6/2020

(Continued)

OTHER PUBLICATIONS

Extended European Search Report including Written Opinion for Application No. 21911209.1 dated Jan. 24, 2025, pp. 1-10.

(Continued)

*Primary Examiner* — Stewart A Fraser
(74) *Attorney, Agent, or Firm* — Lerner David LLP

(57) ABSTRACT

A sealing unit includes a sealing part configured to seal an electrode stack formed by alternately stacking electrodes and separators and a body part extending from the sealing part, wherein a sealing groove that is recessed inward is formed in the sealing part, and the sealing part includes a bottom surface forming the bottom of the sealing groove, a first inclined surface that is an inclined surface extending to be inclined upward from the bottom surface, and a second inclined surface that is an inclined surface extending to be inclined downward from the bottom surface.

17 Claims, 5 Drawing Sheets

(51) Int. Cl.
*H01M 50/186* (2021.01)
*H01M 50/466* (2021.01)

(58) Field of Classification Search
CPC ......... H01M 10/0413; H01M 10/0585; H01M 50/46; H01M 10/04
See application file for complete search history.

(56) References Cited

U.S. PATENT DOCUMENTS

| | | | |
|---|---|---|---|
| 2014/0349167 A1 | 11/2014 | Wakai et al. | |
| 2015/0000117 A1 | 1/2015 | Cho et al. | |
| 2018/0261807 A1* | 9/2018 | Lim | H01M 50/557 |
| 2018/0316041 A1 | 11/2018 | Horikoshi et al. | |
| 2020/0185675 A1 | 6/2020 | Lee et al. | |
| 2020/0203774 A1 | 6/2020 | Chu et al. | |
| 2021/0184301 A1* | 6/2021 | Yamada | H01G 11/80 |
| 2022/0181704 A1 | 6/2022 | Shim et al. | |

FOREIGN PATENT DOCUMENTS

| | | | |
|---|---|---|---|
| EP | 2804240 | A1 | 11/2014 |
| JP | 2004087239 | A | 3/2004 |
| JP | 2018-120803 | A | 8/2018 |
| JP | 2018-530137 | A | 10/2018 |
| KR | 20120052041 | A | 5/2012 |
| KR | 20140086907 | A | 7/2014 |
| KR | 101527124 | B1 | 6/2015 |
| KR | 20160019259 | A | 2/2016 |
| KR | 20160133041 | A | 11/2016 |
| KR | 20190042800 | A | 4/2019 |
| KR | 20200113822 | A | 10/2020 |

OTHER PUBLICATIONS

International Search Report for PCT/KR2021/014564 mailed Feb. 3, 2022. 3 pgs.

* cited by examiner

METHOD FOR MANUFACTURING ELECTRODE ASSEMBLY, SEALING UNIT USED FOR THE SAME, AND ELECTRODE ASSEMBLY MANUFACTURED BY SEALING UNIT

CROSS-REFERENCE TO RELATED APPLICATIONS

The present application is a national phase entry under U.S.C. § 371 of the International Application No. PCT/KR2021/014564 filed on Oct. 19, 2021, which claims priority from Korean Patent Application Nos. 10-2020-0182649, filed on Dec. 23, 2020, and 10-2021-0074476, filed on Jun. 8, 2021, the disclosures of which are incorporated herein by reference in their entireties.

FIELD OF THE INVENTION

The present invention relates to a method for manufacturing an electrode assembly, a sealing unit used for the same, and an electrode assembly manufactured by the sealing unit, and more particularly, to a method for manufacturing an electrode assembly, in which, when a separator on a circumferential portion of the electrode assembly is sealed, the separator is prevented from being folded in any uncontrolled direction so as to be folded and sealed with certain directionality, and when the electrode assembly is inserted into a tight pouch battery case, an interference between the separator on the circumferential portion of the electrode assembly and a sealing part of the pouch is prevented from occurring to realize a secondary battery having superior quality, a sealing unit used for the same, and an electrode assembly manufactured by the sealing unit.

BACKGROUND OF THE INVENTION

In recent years, the price of energy sources increases due to the depletion of fossil fuels, the interest in environmental pollution is amplified, and the demand for eco-friendly alternative energy sources is becoming an indispensable factor for future life. Accordingly, studies on various power generation technologies such as solar power, wind power, and tidal power are continuing, and power storage devices such as batteries for more efficiently using the generated electrical energy are also of great interest.

Furthermore, as technology development and demand for electronic mobile devices and electric vehicles using batteries increase, the demands for batteries as energy sources are rapidly increasing. Thus, many studies on batteries which are capable of meeting various demands have been conducted.

In particular, in terms of materials, there is a high demand for lithium secondary batteries such as lithium ion batteries and lithium ion polymer batteries having advantages such as high energy density, discharge voltage, and output stability.

The secondary batteries are classified into cylindrical batteries and prismatic batteries, in which an electrode assembly is embedded in a cylindrical or prismatic metal can, and pouch-type batteries, in which an electrode assembly is embedded in a pouch-type case made of an aluminum stack sheet according to shapes of battery cases.

The pouch-type battery includes a pouch, in which a cup part having an inner space is formed, and an electrode assembly inserted into the cup part. According to the related art, when the electrode assembly is inserted into the cup part, in order to prevent an interference between a separator around the electrode assembly and a sealing part around the cup part from occurring, a circumferential portion of the electrode assembly, in particular, a corner of the separator may be sealed using a sealing unit, and then, the electrode assembly may be inserted into the cup part. However, in the related art, since sealing is performed using a sealing block having a flat shape, the separators around the electrode assembly are sealed while being folded in an uncontrolled direction.

However, with the advent of the most advanced devices, in response to the chronological change to demands for higher energy density, the size of the pouch case has become increasingly tight. As a result, when the electrode assembly manufactured through the sealing according to the related art is inserted into the cup part of the pouch, an interference between the peripheral separator and the pouch sealing part occurs. Thus, a problem of quality deterioration of the secondary battery occurs.

BRIEF SUMMARY OF THE INVENTION

The present invention has been devised to solve the above problems, and an object of the present invention is to provide a method a method for manufacturing an electrode assembly, in which, when a separator on a circumferential portion of the electrode assembly is sealed, the separator is prevented from being folded in any uncontrolled direction so as to be folded and sealed with certain directionality, and when the electrode assembly is inserted into a tight pouch battery case, an interference between the separator on the circumferential portion of the electrode assembly and a sealing part of the pouch is prevented from occurring to realize a secondary battery having superior quality, a sealing unit used for the same, and an electrode assembly manufactured by the sealing unit.

A method for manufacturing an electrode assembly according to the present invention includes: an electrode stack preparation process of alternately stacking a plurality of electrodes and a plurality of separators to manufacture an electrode stack; a sealing unit preparation process of preparing a sealing unit including a sealing part, in which a sealing groove recessed inward is formed; and a sealing process of inserting the plurality of separators disposed on a circumferential portion of the electrode stack into the sealing groove, wherein the sealing unit seals the plurality of separators using the sealing part.

In the sealing process, the sealing part may seal the separators while gathering the separator, which is disposed above a central portion (O) of the electrode stack, and the separator, which is disposed below the central portion of the electrode stack, toward the central portion in a thickness direction (Y) of the electrode stack.

In the sealing process, the sealing part may perform the sealing of the separators in a state in which the separator disposed at a corner of the electrode stack is inserted into the sealing groove, and the sealing part may perform the sealing by using a bottom surface forming the bottom of the sealing groove, a first inclined surface that is an inclined surface extending to be inclined upward from the bottom surface, and a second inclined surface that is an inclined surface extending to be inclined downward from the bottom surface.

In the sealing process, when the separator disposed at the corner of the electrode stack may be inserted into the sealing groove to perform the sealing, the first inclined surface may fold the separator disposed above the central portion of the electrode stack toward the central portion of the electrode stack, and the second inclined surface may fold the separator disposed below the central portion of the electrode stack toward the central portion of the electrode stack.

A sealing unit according to the present invention includes a sealing part configured to seal an electrode stack formed by alternately stacking electrodes and separators and a body part extending from the sealing part, wherein a sealing groove that is recessed inward is formed in the sealing part, and the sealing part includes a bottom surface forming the bottom of the sealing groove, a first inclined surface that is an inclined surface extending to be inclined upward from the bottom surface, and a second inclined surface that is an inclined surface extending to be inclined downward from the bottom surface.

A length (B) of the bottom surface may correspond to 80% to 90% of a thickness (H) of the electrode stack.

A depth (D) of the bottom surface may have a value corresponding to 40% to 50% of a length of the bottom surface.

Each of an angle (α) between the first inclined surface and the bottom surface and an angle (β) between the second inclined surface and the bottom surface may be 120 degrees to 140 degrees.

The angle (α) between the first inclined surface and the bottom surface and the angle (β) between the second inclined surface and the bottom surface may be the same.

A cross-section of the sealing groove may have a trapezoidal shape.

The sealing unit may further includes an energy supply line configured to supply energy so as to heat the sealing part, wherein the first and second inclined surfaces may extend in a direction inclined upward with respect to a front direction (F) of the bottom surface, and the body part may extends in a rear direction (R) of the bottom surface, and the energy supply line may be inserted into the body part from a rear side of the body part.

An electrode assembly according to the present invention includes: an electrode stack formed by alternately stacking a plurality of electrodes and a plurality of separators, wherein a portion of the plurality of separators forming a periphery of the electrode assembly is sealed by a sealing unit including a sealing part, in which a sealing groove that is recessed inward is formed, wherein, since the plurality of separators disposed on a circumferential portion of the electrode stack are inserted into the sealing groove so as to be sealed by the sealing part, the portion of the plurality of separators is folded with directionality.

An upper separator portion, which is a portion of the separator disposed above a central portion (O) that is a portion disposed at a center in a thickness direction (Y), and a lower separator portion, which is a portion of the separator disposed below the central portion (O), may be folded to be gathered toward the central portion.

The portion of the separator that is folded with the directionality by the sealing process may be a portion of the separator, which forms a corner in the periphery.

An angle at which the upper separator portion is folded toward the central portion and an angle at which the lower separator portion is folded toward the central portion may be symmetric to each other.

The upper separator portion and the lower separator portion may be in close contact with the corner.

The corner may have a chamfered shape.

A secondary battery according to the present invention includes: the electrode assembly; and a pouch case, into which the electrode assembly is inserted.

In the method for manufacturing the electrode assembly according to the present invention, and the sealing unit used for the same, when the separator on the circumferential portion of the electrode assembly is sealed, the separator is prevented from being folded in any uncontrolled direction so as to be folded and sealed with the certain directionality, and when the electrode assembly is inserted into the tight pouch battery case, the interference between the separator on the circumferential portion of the electrode assembly and the sealing part of the pouch is prevented from occurring to realize the secondary battery having superior quality.

DETAILED DESCRIPTION

Figure 1:
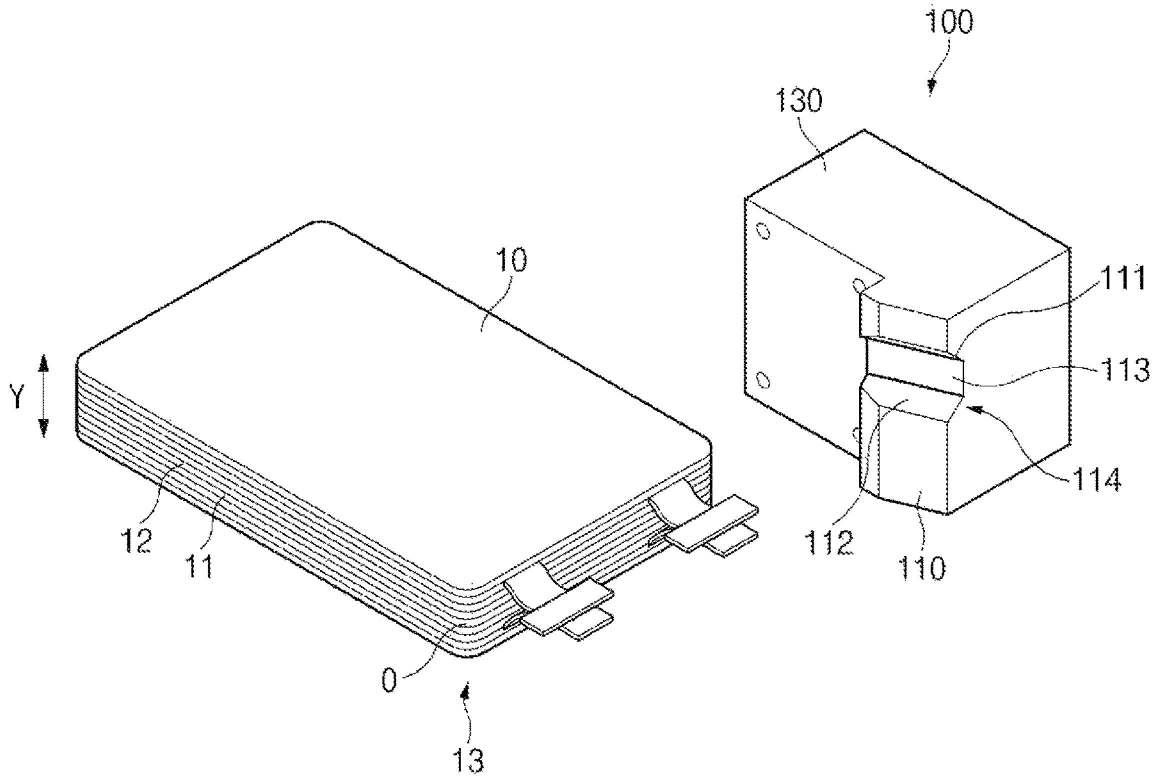
FIG. 1 is a perspective view illustrating an electrode stack and a sealing unit that seals a separator of the electrode stack according to Embodiment 1 of the present invention.

Hereinafter, preferred embodiments of the present invention will be described in detail with reference to the accompanying drawings so that those of ordinary skill in the art can easily carry out the present invention. However, the present invention may be implemented in several different forms and is not limited or restricted by the following examples.

In order to clearly explain the present invention, detailed descriptions of portions that are irrelevant to the description or related known technologies that may unnecessarily obscure the gist of the present invention have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

Embodiment 1

Figure 2:
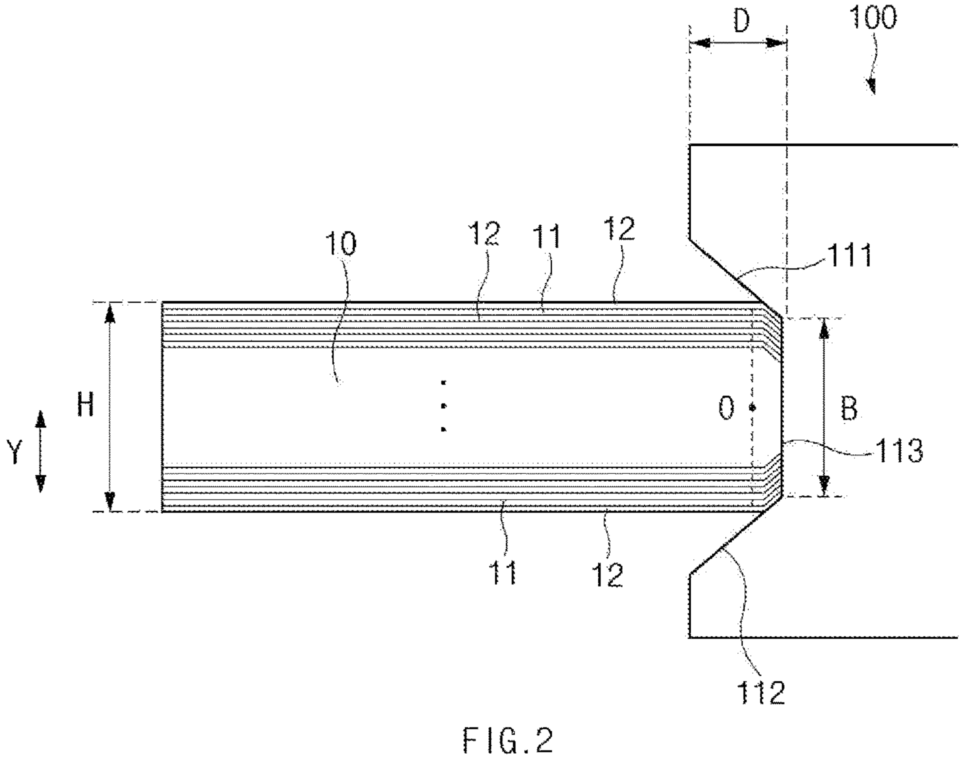
FIG. 2 is a cross-sectional view illustrating a process of sealing a separator of a corner of the electrode stack according to Embodiment 1 of the present invention.
Figure 3:
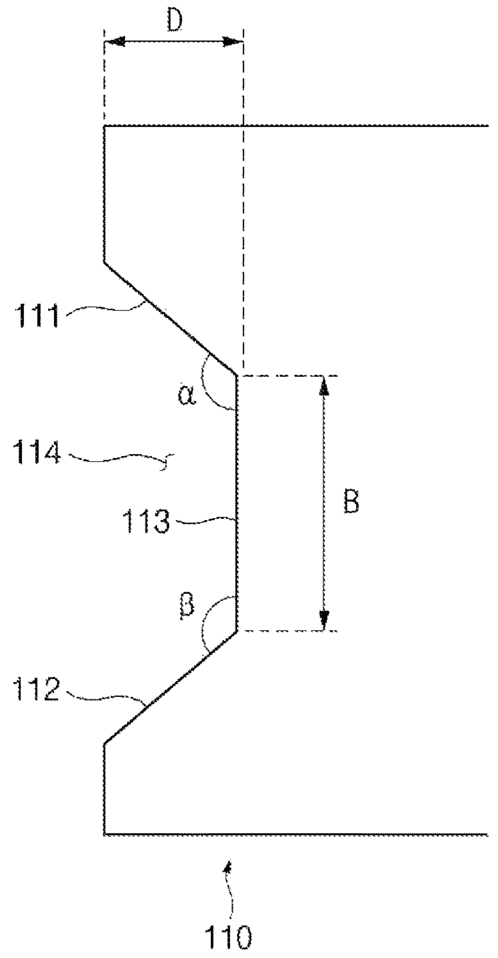
FIG. 3 is an enlarged cross-sectional view illustrating only a sealing part of the sealing unit according to Embodiment 1 of the present invention.

FIG. 1 is a perspective view illustrating an electrode stack and a sealing unit that seals a separator of the electrode stack according to Embodiment 1 of the present invention. FIG. 2 is a cross-sectional view illustrating a process of sealing a separator of a corner of the electrode stack according to Embodiment 1 of the present invention. FIG. 3 is an enlarged cross-sectional view illustrating only a sealing part of the sealing unit according to Embodiment 1 of the present invention.

Referring to FIGS. 1 to 3, a sealing unit 100 according to Embodiment 1 of the present invention may be a mechanism for sealing an electrode stack 10. The electrode stack 10 may have a shape in which electrodes 11 and separators 12 are alternately stacked. The sealing unit 100 may include a sealing part 110 sealing the electrode stack 10 and a body part 130 extending from the sealing part 110. As illustrated in FIG. 1, the sealing part 110 may have a shape that protrudes laterally from the body part 130 to extend.

A sealing groove 114 recessed inward may be formed in the sealing part 110. The sealing part 110 may include a bottom surface 113, a first inclined surface 111, and a second inclined surface 112. The bottom surface 113 may be a portion forming the bottom of the sealing groove 114. The first inclined surface 111 may be an inclined surface extending upward from the bottom surface 113. The second inclined surface 112 may be an inclined surface extending downward from the bottom surface 113.

The sealing unit 100 according to Embodiment 1 of the present invention, which includes the above-described constitutes, prevents the separator 12 from being folded in an uncontrolled arbitrary direction when sealing the separator 12 on a circumferential portion of the electrode stack 10.

Referring to FIGS. 1 and 2, the electrode stack 10 may include a plurality of separators 12, and the sealing part 110 may seal the plurality of separators 12 so that the separators 12 are folded with a certain directionality on the circumferential portion of the electrode stack 10. That is, the folding direction of the separators 12 may be controlled.

For example, the sealing part 110 may seal the separators 12 while gathering the separator 12, which is disposed above a central portion O of the electrode stack 10, and the separator 12, which is disposed below the central portion O of the electrode stack 10, toward the central portion in a thickness direction Y of the electrode stack 10.

FIG. 2 is a cross-sectional view illustrating a process of sealing the separator 12 of the corner 13 of the electrode stack 10 according to Embodiment 1 of the present invention. Referring to FIG. 2, the sealing part 110 may perform sealing of the separator 12 in a state in which the separator 12 disposed at the corner 13 of the electrode stack 10 is inserted into the sealing groove 114. In this case, the bottom surface 113, the first inclined surface 111, and the second inclined surface 112 of the sealing part 110 may seal the separator 12.

Specifically, when the separator 12 disposed at the corner 13 of the electrode stack 10 for the sealing is inserted into the sealing groove 114, the first inclined surface 111 may fold the separator 12 disposed above the central portion of the electrode stack 10 toward the central portion of the electrode stack 10 in the thickness direction of the electrode stack 10. In addition, the second inclined surface 112 may fold the separator 12 disposed below the central portion of the electrode stack 10 toward the central portion of the electrode stack 10.

When folded and sealed in this manner, the separators 12 disposed at the corners 13 of the electrode stack 10 may be folded and sealed with a controllable constant directionality. As a result, the separators 12 have a shape attached to a body of the electrode stack 10 at the corner 13 of the electrode stack 10.

When a neat electrode assembly 10-1 (see FIG. 5), in which the sealing of the separator 12 is completed in this manner, is inserted into a tight pouch battery case (that is, a battery case that is almost fitted with a size of the electrode assembly 10-1), an interference between a circumferential portion (particularly, the corner 13) of the electrode assembly and the sealing part (particularly, the sealing part of the pouch, which is adjacent to the corner of the cup part of the pouch) of the pouch may be prevented. As a result, a secondary battery having excellent quality may be realized.

Referring to FIGS. 2 and 3, in the sealing unit 100 according to Embodiment 1 of the present invention, a cross-section of the sealing groove 114 may have a trapezoidal shape. The trapezoidal shape may be desirable to achieve the object of the present invention.

Also, in this case, it may be preferable that a length B of the bottom surface 113 corresponds to 80% to 90% of a thickness H of the electrode stack 10. If it is less than 80%, since the cross-sectional shape of the sealing groove 114 becomes relatively closer to a triangular shape, a degree of reliable folding for preventing the interference may be partially weak. Also, when it is greater than 90%, the number of separators 12 that are surely folded in a certain direction may be less than a certain number.

In addition, a depth D of the bottom surface 113 may preferably have a value corresponding to 40% to 50% of the length of the bottom surface 113. If it is deeper than 50%, since the cross-sectional shape of the sealing groove 114 becomes relatively closer to a triangular shape, the degree of reliable folding for preventing the interference may be partially weak. In addition, when the depth is less than 40%, a length of each of the first and second inclined surfaces guiding the separator 12 is shortened, and thus, a function of the first and second inclined surfaces, which guide the separator 12, may be partially weakened.

In addition, in the sealing unit 100 according to Embodiment 1 of the present invention, an angle α between the first inclined surface 111 and the bottom surface 113 may be 120 degrees to 140 degrees. In addition, an angle β between the second inclined surface 112 and the bottom surface 113 may also be 120 degrees to 140 degrees.

When the angle between the inclined surface and the bottom surface 113 is smaller than 120 degrees, a size of the sealing groove 114 becomes relatively small, and thus, in a process of inserting the electrode stack 10 into the sealing groove 114, the electrode stack 10 may be easily inserted. In addition, when the angle between the inclined surface and the bottom surface 113 is greater than 140 degrees, the folding angle of the separator 12 may be reduced in proportion thereto.

In addition, the angle α between the first inclined surface 111 and the bottom surface 113 and the angle β between the second inclined surface 112 and the floor surface 113 may be the same as each other. When the angle α between the first inclined surface 111 and the bottom surface 113 and the angle β between the second inclined surface 112 and the floor surface 113 are the same as each other, it has a vertically symmetrical structure, and thus, the separator 12 folded from an upper side to a lower side and the separator 12 folded from the lower side to the upper side may have a symmetrical shape. As a result, a balanced electrode stack 10 may be manufactured to realize a stable secondary battery.

Embodiment 2

Figure 4:
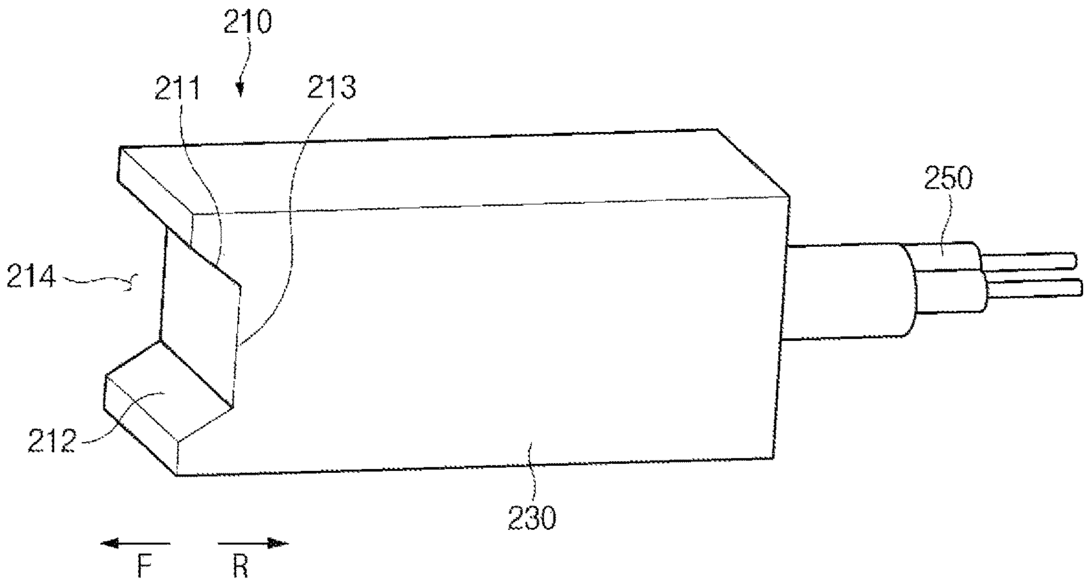
FIG. 4 is a perspective view of a sealing unit according to Embodiment 2 of the present invention.

FIG. 4 is a perspective view of a sealing unit according to Embodiment 2 of the present invention.

Embodiment 2 of the present invention is different from Embodiment 1 in that a sealing part 210 and a body part 230 have the same width and have a structure that continues in a straight line, and an energy supply line 250 is inserted into the body part 230 from a rear side of the body part 230.

The contents that are duplicated with Embodiment 1 will be omitted as much as possible, and Embodiment 2 will be described with a focus on the differences. That is, it is obvious that the contents that are not described in Embodiment 2 may be regarded as the contents of Embodiment 1 if necessary.

Referring to FIG. 4, in a sealing unit 200 according to Embodiment 2 of the present invention, the sealing part 210 may extend forward, and the body part 230 may extend backward in an opposite direction to the forward direction. The sealing part 210 and the body part 230 may have the same width and may be integrally formed in a shape extending forward and backward on one virtual straight line.

Also, in the sealing unit 200 according to Embodiment 2 of the present invention, a first inclined surface 211 and a second inclined surface 212 may extend in an inclined direction with respect to a front direction F of the bottom surface 213. The first inclined surface 211 may extend in a direction inclined upward with respect to the front direction F of the bottom surface 213. The second inclined surface 212 may extend in a direction inclined downward with respect to the front direction F of the bottom surface 213. Also, the body part 230 may extend in a rear direction R of the bottom surface 213.

The sealing unit 200 according to Embodiment 2 of the present invention may further include an energy supply line 250. The energy supply line 250 may be configured to supply energy so as to heat the sealing part 210. This may be, for example, an electric wire for supplying electricity. The energy supply line 250 may have a shape that is inserted into the body part 230 from a rear side of the body part 230. In the case of having such a shape, the energy supply line 250 is not caught (i.e., not disturbed) in the electrode stack 10 having various shapes that move to be inserted into a sealing groove 214, and thus, a sealing operation may be smoothly performed.

Embodiment 3

Figure 5:
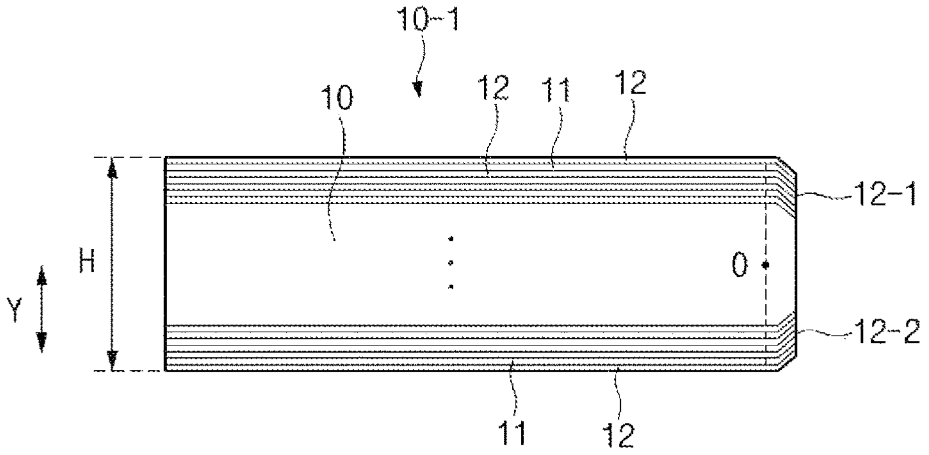
FIG. 5 is a cross-sectional view illustrating an electrode assembly, in which the separator is sealed by the sealing unit according to Embodiment 1 of the present invention.

FIG. 5 is a cross-sectional view illustrating an electrode assembly, in which the separator is sealed by the sealing unit according to Embodiment 1 of the present invention.

Embodiment 3 of the present invention will be described with respect to an electrode assembly, in which a separator is sealed by the sealing unit according to Embodiment 1 of the present invention, and a secondary battery including the electrode assembly.

The contents that are duplicated with Embodiment 1 will be omitted as much as possible, and Embodiment 3 will be described with a focus on the differences. That is, it is obvious that the contents that are not described in Embodiment 3 may be regarded as the contents of Embodiment 1 if necessary.

Referring to FIG. 5, an electrode assembly 10-1 according to Embodiment 3 of the present invention includes an electrode stack 10 formed by alternately stacking a plurality of electrodes and a plurality of separators, and portions of the plurality of separators forming a periphery of the electrode stack 10 are sealed by a sealing unit including a sealing part, in which a sealing groove recessed inward is formed. In addition, as the plurality of separators disposed at the circumferential portion of the electrode stack 10 are inserted into the sealing groove and sealed by the sealing part, the plurality of separators may be folded with directionality.

The electrode assembly 10-1 according to Embodiment 3 of the present invention may be formed by alternately stacking a plurality of electrodes 11 and separators 12. In addition, a portion of each of the separators forming the periphery of the electrode assembly may be folded with directionality by a sealing process.

Specifically, the electrode assembly 10-1 according to Embodiment 3 of the present invention includes an upper separator portion, which is a portion of the separator disposed above a central portion O, which is a portion disposed at a center in a thickness direction Y, and a lower separator portion, which is a portion of the separator disposed below the central portion O, may be folded to be gathered toward the central portion.

Here, the portion of the separator that is folded with the directionality by the sealing process may be a portion of the separator, which forms a corner 13 in the periphery of the electrode assembly 10-1. In addition, the upper separator portion 12-1 and the lower separator portion 12-2 may be in close contact with the corner 13 of the electrode assembly 10-1.

In the electrode assembly 10-1 according to Embodiment 3 of the present invention, which is formed in this manner, when the electrode assembly 10-1 is inserted into a tight pouch case, an interference between the separator on the circumferential portion (particularly, the corner) of the electrode assembly 10-1 and the pouch sealing part may be prevented from occurring. As a result, a secondary battery having excellent quality may be realized.

In addition, in the electrode assembly 10-1 according to Embodiment 3 of the present invention, an angle at which the upper separator portion is folded toward the central portion and an angle at which the lower separator portion is folded toward the central portion may be symmetric to each other. As described above, when the separator folded from an upper side to a lower side and the separator folded from the lower side to the upper side have a symmetrical shape, a balanced electrode assembly 10-1 may be manufactured to realize a stable secondary battery.

The electrode assembly 10-1 according to Embodiment 3 of the present invention may be inserted into the pouch case to form the secondary battery. Specifically, the completed secondary battery may be realized by the electrode assembly and the pouch case into which the electrode assembly 10-1 is inserted. Here, the interference between the separator of the corner 13 of the electrode assembly 10-1 and the corner inside the pouch case may not occur.

Particularly, in a secondary battery in which an additional sealing area is formed in a pouch-type secondary battery, the present invention may be remarkably effective in preventing the interference between the separator of the corner of the electrode assembly 10-1 and the corner inside the pouch case sealing part.

Figure 6:
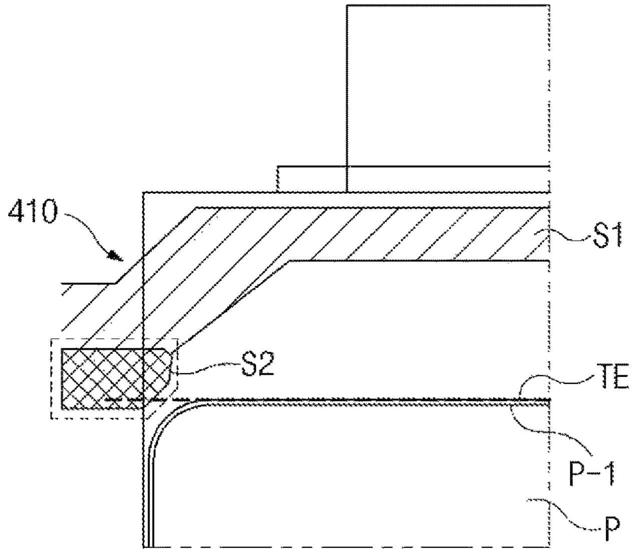
FIG. 6 is a plan view illustrating a process of forming a sealing part through a pouch lead sealing process and an additional sealing process in a secondary battery.

FIG. 6 is a plan view illustrating a process of forming a sealing part 410 through a pouch lead sealing process and an additional sealing process in a secondary battery.

Referring to FIG. 6, a process of forming the sealing part 410 in a process of manufacturing process a pouch-type secondary battery, which has recently been improved in space efficiency and have high energy density, may be specifically sealed by two stages. The two-stage sealing may mean a normal lead sealing process and an additional sealing process.

A normal lead sealing area S1 may be formed through the normal lead sealing process, and an additional sealing area S2 may be formed through the additional sealing process. When more particularly describing a shape of the sealing part 410 with reference to FIG. 6, one end of the sealing part is formed below an upper end TE of a periphery P−1 of a cup P of an exterior.

In FIG. 6, the periphery P−1 and the upper end TE of the cup are specifically illustrated. The periphery P−1 of the cup may mean a peripheral portion of the cup P having an internal accommodation space into which an electrode assembly is inserted. Particularly, the periphery P−1 of the cup P may mean an upper periphery of the cup, not a periphery of a bottom portion of the cup. Here, the upper portion may mean an upper portion based on a thickness direction of the secondary battery.

As described above, when an additional sealing area S2 exists in the improved pouch-type secondary battery, an interference frequently occurs between a separator of a corner of the electrode assembly and a corner inside a pouch case sealing part according to the related art. However, in the case of a sealing unit and an electrode assembly manufactured by the sealing unit according to an embodiment of the present invention, an interference between a separator of a corner of the electrode assembly and a corner inside a pouch case sealing part (a problem in which, when the pouch is sealed, an end of the separator is inserted into a sealing area) may be prevented.

Embodiment 4

Figure 7:
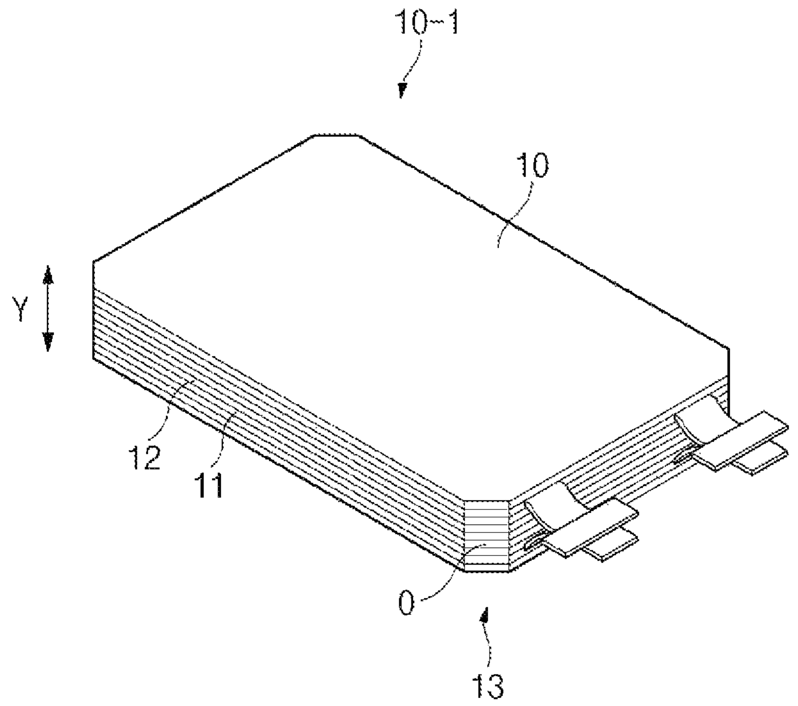
FIG. 7 is a cross-sectional view illustrating another example of the electrode assembly, in which the separator is sealed by the sealing unit according to Embodiment 1 of the present invention.

FIG. 7 is a cross-sectional view illustrating another example of the electrode assembly, in which the separator is sealed by the sealing unit according to Embodiment 1 of the present invention.

Embodiment 4 of the present invention will be described with respect to another example of the electrode assembly, in which a separator is sealed by the sealing unit according to Embodiment 1 of the present invention.

Referring to FIG. 7, in an electrode assembly 10-1 according to Embodiment 4 of the present invention, a portion of a separator forming a periphery of an electrode stack 10 may be folded with predetermined directionality by a sealing process in the electrode stack 10 formed by alternately stacking a plurality of electrodes 11 and separators 12.

Specifically, the electrode assembly according to Embodiment 4 of the present invention includes an upper separator portion, which is a portion of the separator disposed above a central portion O that is a portion disposed at a center in a thickness direction Y, and a lower separator portion, which is a portion of the separator disposed below the central portion O, may be folded to be gathered toward the central portion.

Here, the portion of the separator that is folded with the directionality by the sealing process may be a portion of the separator, which forms a corner 13 in the periphery of the electrode assembly. Also, here, the corner 13 may have a chamfered shape, and the upper separator portion 12-1 and the lower separator portion 12-2 may be in close contact with the corner 13 of the electrode assembly.

In the electrode assembly 10-1 according to Example 3 of the present invention, which is formed in this manner, when the electrode assembly is inserted into the tight pouch case, the interference between the separator of the circumferential portion (particularly, the corner) of the electrode assembly and the sealing part of the pouch may be prevented, and also, the electrode assembly may be inserted into an insertion space of the secondary battery, which is limited in corner space, the secondary battery may be realized in more advantageous shape.

Embodiment 5

Embodiment 5 of the present invention relates to a method for manufacturing an electrode assembly using the sealing unit according to Embodiment 1 of the present invention.

The contents that are duplicated with the foregoing embodiments will be omitted as much as possible, and Embodiment 5 will be described with a focus on the differences. That is, it is obvious that the contents that are not described in Embodiment 5 may be regarded as the contents of the foregoing embodiments if necessary.

Referring to FIGS. 1 to 3, a method for manufacturing an electrode assembly according to Example 5 of the present invention may include a process of manufacturing an electrode stack, a process of preparing a sealing unit, and a sealing process.

Figure 8:
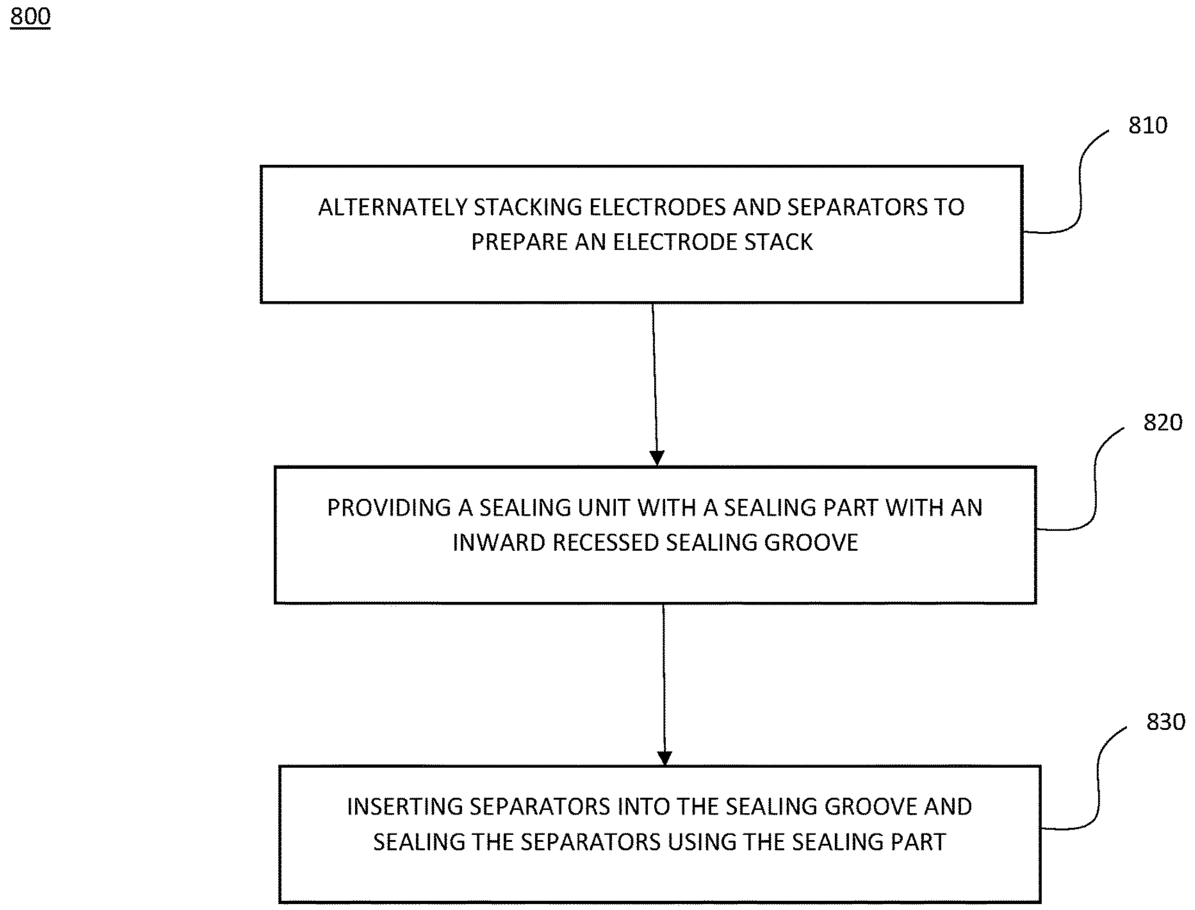
FIG. 8 is a flow chart illustrating a method for manufacturing an electrode assembly according to an aspect of the present invention.

Also referring to FIG. 8, The process 800 of manufacturing the electrode stack may be a process of manufacturing an electrode stack 10 by alternately stacking a plurality of electrodes and a plurality of separators 12, at 810. The process of preparing the sealing unit may be a process of preparing a sealing unit 100 including a sealing part 110 in which a sealing groove 114 recessed inward is formed at 820. Also, the sealing process may be a process of inserting the plurality of separators 12 disposed on a circumferential portion of the electrode stack 10 into the sealing groove 114, at 830. Here. The sealing unit 100 may seal the plurality of separators 12 using the sealing part 110.

The sealing process may be a process of performing the sealing while folding the separators 12 to be gathered toward a central portion. Particularly, in the sealing process, the sealing part 110 may seal the separators 12 while gathering the separator 12, which is disposed above a central portion O of the electrode stack 10, and the separator 12, which is disposed below the central portion O of the electrode stack toward the central portion in a thickness direction Y of the electrode stack 10.

In addition, in the sealing process, the sealing part 110 may perform the sealing of the separators 12 in a state in which a separator 12 disposed at a corner 13 of the electrode stack 10 is inserted into the sealing groove 114. Also, the sealing part 110 may perform the sealing by using a bottom surface forming the bottom of the sealing groove 114, a first inclined surface 111 that is an inclined surface extending to be inclined upward from the bottom surface, and a second inclined surface 112 that is an inclined surface extending to be inclined downward from the bottom surface.

Specifically, in the sealing process, when the separator 12 disposed at the corner 13 of the electrode stack is inserted into the sealing groove 114 to perform the sealing, the first inclined surface 111 may fold the separator 12 disposed above the central portion O of the electrode stack toward the central portion O of the electrode stack 10, and the second inclined surface 112 may fold the separator 12 disposed below the central portion O of the electrode stack 10 toward the central portion O of the electrode stack 10.

When folded and sealed in this manner, each of the separators 12 disposed at a side or the corner 13 of the electrode stack 10 may be folded and sealed with a controllable constant directionality. As a result, each of the separators 12 may have a shape attached to a body of the electrode stack at the side or the corner 13 of the electrode stack 10.

When a neat electrode assembly 10-1, in which the sealing of the separator 12 is completed in this manner, is inserted into a tight pouch battery case (that is, a battery case that is almost fitted with a size of the electrode assembly 10-1), an interference between a circumferential portion (particularly, the corner) of the electrode assembly and the sealing part of the pouch may be prevented. As a result, a secondary battery having excellent quality may be realized.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Electrode stack
10-1: Electrode assembly
11: Electrode
12: Separator
12-1: Upper separator portion
12-2: Lower separator portion
13: Corner
100, 200: Sealing unit
110, 210: Sealing part
111, 211: First inclined surface
112, 212: Second inclined surface
113, 213: Bottom surface
114, 214: Sealing groove 130, 230: Body part
250: Energy supply line
O: Central portion
B: Length of bottom surface
D: Depth of bottom surface
H: Thickness of electrode stack
Y: Thickness direction of electrode stack
α: Angle between first inclined surface and bottom surface
β: Angle between second inclined surface and bottom surface
F: Front direction of bottom surface
R: Rear direction of bottom surface

The invention claimed is:

1. A method for manufacturing an electrode assembly, the method comprising:
- alternately stacking a plurality of electrodes and a plurality of separators to manufacture an electrode stack;
- providing a sealing unit comprising a sealing part, in which a sealing groove recessed inward is formed; and
- inserting the plurality of separators disposed on a circumferential portion of the electrode stack into the sealing groove such that portions of the plurality of separators received in the sealing groove are inclined toward a central portion of the electrode stack, wherein the sealing unit seals the plurality of separators using the sealing part.

2. The method of claim 1, wherein, the sealing part seals the separators while gathering at least one of the plurality of separators disposed above the central portion (O) of the electrode stack, and at least one of the plurality of separators disposed below the central portion of the electrode stack, toward the central portion in a thickness direction (Y) of the electrode stack.

3. The method of claim 2, wherein, the sealing part performs the sealing of the plurality of separators in a state in which the separators disposed at a corner of the electrode stack are inserted into the sealing groove, and
- the sealing part performs the sealing by using a bottom surface forming the bottom of the sealing groove, a first inclined surface extending to be inclined upward from the bottom surface, and a second inclined surface extending to be inclined downward from the bottom surface.

4. The method of claim 3, wherein, when the separators disposed at the corner of the electrode stack are inserted into the sealing groove to perform the sealing,
- the first inclined surface folds the at least one separator disposed above the central portion of the electrode stack toward the central portion of the electrode stack, and
- the second inclined surface folds the at least one separator disposed below the central portion of the electrode stack toward the central portion of the electrode stack.

5. A sealing unit comprising:
- a sealing part configured to seal an electrode stack formed by alternately stacking electrodes and separators; and
- a body part extending from the sealing part,
- wherein a sealing groove that is recessed inward is formed in the sealing part, and
- the sealing part comprises:
  - a bottom surface forming the bottom of the sealing groove;
  - a first inclined surface extending to be inclined upward from the bottom surface; and
  - a second inclined surface extending to be inclined downward from the bottom surface,
- wherein the first inclined surface and the second inclined surface are configured so to bend the separators toward a center of the electrode stack such that the ends of the separators contact the bottom surface.

6. The sealing unit of claim 5, wherein a length (B) of the bottom surface corresponds to 80% to 90% of a thickness (H) of the electrode stack.

7. The sealing unit of claim 5, wherein a depth (D) of the bottom surface has a value corresponding to 40% to 50% of a length of the bottom surface.

8. The sealing unit of claim 5, wherein each of an angle (α) between the first inclined surface and the bottom surface and an angle (β) between the second inclined surface and the bottom surface is 120 degrees to 140 degrees.

9. The sealing unit of claim 8, wherein the angle (α) between the first inclined surface and the bottom surface and the angle (β) between the second inclined surface and the bottom surface are the same.

10. The sealing unit of claim 5, wherein a cross-section of the sealing groove has a trapezoidal shape.

11. The sealing unit of claim 5, further comprising an energy supply line configured to supply energy so as to heat the sealing part,
- wherein the first and second inclined surfaces extend in a direction inclined upward with respect to a front direction (F) of the bottom surface, and the body part extends in a rear direction (R) of the bottom surface, and
- the energy supply line is inserted into the body part from a rear side of the body part.

12. An electrode assembly comprises:
- an electrode stack formed by alternately stacking a plurality of electrodes and a plurality of separators, wherein a portion of the plurality of separators forming a periphery of the electrode assembly is sealed, wherein, a portion of the plurality of separators disposed on a circumferential portion of the electrode stack is folded with predetermined directionality, and wherein an upper separator portion, which is a portion of at least one of the plurality of separators disposed above a central portion (O) that is a portion disposed at a center in a thickness direction (Y), and a lower separator portion, which is a portion of at least one of the plurality of separators disposed below the central portion (O), are folded to be gathered toward the central portion.

13. A secondary battery comprising:

the electrode assembly of claim 12; and a pouch case, into which the electrode assembly is inserted.

14. The electrode assembly of claim 12, wherein the portion of the at least one separator that is folded with the predetermined directionality by the sealing process is a portion of the at least one separator, which forms a corner in a periphery.

15. The electrode assembly of claim 14, wherein an angle at which the upper separator portion is folded toward the central portion and an angle at which the lower separator portion is folded toward the central portion are symmetric to each other.

16. The electrode assembly of claim 15, wherein the upper separator portion and the lower separator portion are in close contact with the corner.

17. The electrode assembly of claim 16, wherein the corner has a chamfered shape.

* * * * *